United States Patent
Wang et al.

(10) Patent No.: US 11,818,065 B2
(45) Date of Patent: Nov. 14, 2023

(54) METHOD, APPARATUS AND SYSTEM FOR SENDING UPLINK REFERENCE SIGNAL, BASE STATION AND TERMINAL

(71) Applicant: ZTE CORPORATION, Shenzhen (CN)

(72) Inventors: Yuxin Wang, Shenzhen (CN); Zhaohua Lu, Shenzhen (CN); Chuangxin Jiang, Shenzhen (CN); Yijian Chen, Shenzhen (CN); YUNgok Li, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 1262 days.

(21) Appl. No.: 16/338,337

(22) PCT Filed: Sep. 29, 2017

(86) PCT No.: PCT/CN2017/104419
§ 371 (c)(1),
(2) Date: Nov. 1, 2019

(87) PCT Pub. No.: WO2018/059547
PCT Pub. Date: Apr. 5, 2018

(65) Prior Publication Data
US 2023/0188285 A1    Jun. 15, 2023

(30) Foreign Application Priority Data
Sep. 30, 2016  (CN) .......................... 201610875406.3

(51) Int. Cl.
*H04L 5/00*      (2006.01)
*H04W 72/10*    (2009.01)
(Continued)

(52) U.S. Cl.
CPC ........... *H04L 5/0051* (2013.01); *H04W 72/23* (2023.01); *H04B 7/0626* (2013.01)

(58) Field of Classification Search
CPC .............................. H04L 5/0051; H04W 72/23
See application file for complete search history.

(56) References Cited

U.S. PATENT DOCUMENTS

2011/0310818 A1   12/2011   Lin et al.
2012/0044906 A1   2/2012    Chen et al.
(Continued)

FOREIGN PATENT DOCUMENTS

| | | |
|---|---|---|
| CN | 101583080 A | 11/2009 |
| CN | 102404854 A | 4/2012 |

(Continued)

OTHER PUBLICATIONS

International Search Report for International Application No. PCT/CN2017/104419, Date of Completion: Dec. 5, 2017; dated Jan. 4, 2018; 2 Pages.

(Continued)

*Primary Examiner* — Ronald B Abelson
(74) *Attorney, Agent, or Firm* — Li & Cai Intellectual Property (USA) Office

(57) ABSTRACT

A method for sending uplink reference signal includes: indicating, by a base station using high-layer signalling or downlink control signalling, a terminal to send an uplink reference signal in one or more sending manners; or predefining, by both the base station and the terminal, a sending manner or resource used for sending the uplink reference signal.

18 Claims, 2 Drawing Sheets

A BASE STATION INSTRUCTING, BY HIGH-LAYER SIGNALLING OR DOWNLINK CONTROL SIGNALLING, A TERMINAL TO SEND AN UPLINK REFERENCE SIGNAL IN ONE OR MORE SENDING MANNERS — S102

OR BOTH OF THE BASE STATION AND THE TERMINAL PREDEFINING A SENDING MANNER OR RESOURCE USED FOR SENDING THE UPLINK REFERENCE SIGNAL — S104

(51) Int. Cl.
*H04W 72/23* (2023.01)
*H04B 7/06* (2006.01)

(56) References Cited

U.S. PATENT DOCUMENTS

2015/0381246 A1   12/2015  Huang et al.
2016/0254869 A1*  9/2016  Wen ..................... H04L 5/0073

FOREIGN PATENT DOCUMENTS

| | | |
|---|---|---|
| CN | 103905104 A | 7/2014 |
| CN | 103944665 A | 7/2014 |
| CN | 104023382 A | 9/2014 |
| CN | 105451155 A | 3/2016 |
| WO | 2015096074 A1 | 7/2015 |
| WO | WO2016124060 A1 | 8/2016 |

OTHER PUBLICATIONS

China Patent Office, First Office Action dated Aug. 24, 2022, for corresponding Chinese application No. 201610875406.3.

* cited by examiner

METHOD, APPARATUS AND SYSTEM FOR SENDING UPLINK REFERENCE SIGNAL, BASE STATION AND TERMINAL

CROSS REFERENCE

This application is the 371 application of PCT Application No. PCT/CN2017/104419 filed Sep. 29, 2017, which is based upon and claims priority to Chinese Patent Application No. 201610875406.3, filed on Sep. 30, 2016 the entire contents thereof are incorporated herein by reference.

TECHNICAL FIELD

The present disclosure relates to the field of communication technologies, and more particularly, to a method, apparatus and system for sending uplink reference signal, base station and terminal.

BACKGROUND

In the related art, in the Long Term Evolution (LTE), a Physical Downlink Control Channel (PDCCH) is used to carry uplink and downlink scheduling information and uplink power control information. The Downlink Control Information (DCI) format is divided into DCI format 0, 1, 1A, 1B, 1C, 1D, 2, 2A, 3, and 3A, etc., and when it evolved to LTE-A Release 12 later, DCI format 2B, 2C, and 2D have been added to support a variety of different applications and sending manners. An e-Node-B (hereinafter referred to as an eNB) may configure User Equipment (UE) through the downlink control information, or the user equipment may receive a high-layer configuration, which also known as configuring UE by high-layer signalling.

A Sounding Reference Signal (SRS) is used to measure Channel State Information (CSI) between the user equipment and the eNB. In the LTE system, the UE periodically sends an uplink SRS on the last data symbol of the sending subframe according to parameters such as a frequency band indicated by the eNB, a frequency-domain position, a sequence cyclic shift, a period, and a subframe offset. The eNB determines the uplink CSI of the UE based on the received SRS, and performs operations such as frequency-domain selection scheduling, closed loop power control, and the like based on the obtained CSI.

In the study of the current LTE-A Release 10, it is proposed that, non-precoded SRS should be used in uplink communication, i.e., antenna-specific SRS, and De Modulation Reference Signal (DMRS) for PUSCH is precoded. The base station could estimate the uplink original CSI by receiving the non-precoded SRS, a precoding DMRS does not enable the base station to estimate the original uplink CSI. At this time, when the UE sends the non-precoded SRS by using multiple antennas, the SRS resources required by each UE are increased, which results in a decrease in the number of UEs that could be simultaneously multiplexed in the system. The UE may send the SRS by using the high-level signalling (also referred to as triggered by the trigger type 0) or the downlink control information (also referred to as triggering by the trigger type 1), and a periodic SRS is triggered based on the high-level signalling, and an aperiodic SRS is triggered based on the downlink control information. In the LTE-A Release 10, an aperiodic SRS sending manner is added, which improves the utilization of SRS resources to some extent and improves the flexibility of resource scheduling.

With the development of communication technology, the demand for data services continues to increase, and the available low-frequency carriers are already very scarce. Therefore, high-frequency (30~300 GHz) carrier communication based on underutilization has become one of the important communication ways to solve high-speed data communication in the future. The available bandwidth of high frequency carrier communication is very large and could provide efficient high-speed data communication. However, a big technical challenge faced by high-frequency carrier communication is that fading of high-frequency signals in space is very large relative to the low-frequency signal, although a spatial fading loss problem of the high-frequency signals in the outdoor communication is caused, due to its wavelength reduction, more antennas could be used usually so that beam-based communication compensates for fading loss in space.

However, when the number of antennas increases, since each antenna is required to have a set of radio frequency links at this time, beamforming based on digital also brings about an increase in cost and power loss. Therefore, in the present study, the hybrid beamforming is preferred, that is, the radio frequency beam and the digital beam together form the final beam.

In the research of the new radio access technology, in the high-frequency communication system, besides the eNB configures a large number of antennas to form downlink transmission beams to compensate for the spatial fading of high-frequency communication, the user equipment also configures a large number of antennas to form uplink transmission beams, and the sending of the SRS is also sent in the form of a beam. How to indicate the beam sending of the SRS by signalling is a problem to be solved.

In the related art, there is no effective solution to the problem that the technical solution for sending the uplink reference signal is imperfect.

SUMMARY

In order to solve the problem that the technical solution for sending the uplink reference signal is imperfect, the embodiments of the present disclosure provide a method, apparatus and system for sending uplink reference signal, base station and terminal.

According to an embodiment of the present disclosure, a method for sending an uplink reference signal is provided, including: indicating, by a base station using high-layer signalling or downlink control signalling, a terminal to send an uplink reference signal in one or more sending manners; or predefining, by both the base station and the terminal, a sending manner or resource used for sending the uplink reference signal.

According to another embodiment of the present disclosure, a method for sending an uplink reference signal is also provided, including: receiving, by a terminal, indication information sent by a base station using high-layer signalling or downlink control signalling, and sending an uplink reference signal in one or more sending manners based on the indication information; or sending, by the terminal, the uplink reference signal using a sending manner or resource predefined by both the base station and the terminal.

According to another embodiment of the present disclosure, an apparatus for sending an uplink reference signal is also provided, which is applied to a base station, including: an indication module, adapted to indicate, by using high-layer signalling or downlink control signalling, a terminal to send an uplink reference signal in one or more sending manners; or, predefine, by both the base station and the terminal, a sending manner or resource used for sending the uplink reference signal.

According to another embodiment of the present disclosure, an apparatus for sending an uplink reference signal is also provided, which is applied to a terminal, including: an indication receiving module, adapted to receive indication information sent by a base station using high-layer signalling or downlink control signalling, and send an uplink reference signal in one or more sending manners based on the indication information; or send, by the terminal, the uplink reference signal using a sending manner or resource predefined by both the base station and the terminal.

According to another embodiment of the present disclosure, a system for sending an uplink reference signal is also provided, including: a base station and a terminal; indicating, by the base station using high-layer signalling or downlink control signalling, the terminal to send an uplink reference signal in one or more sending manners; or predefining, by both the base station and the terminal, a sending manner or resource used for sending the uplink reference signal.

According to another embodiment of the present disclosure, a base station is also provided, including: a first processor and a first communication apparatus, wherein, the first processor is adapted to determine an indication information for indicating a terminal to send an uplink reference signal in one or more sending manners; the first communication apparatus is connected with the first processor, and adapted to send the indication information to the terminal by using high-layer signalling or downlink control signalling; or the first communication apparatus is further adapted to transmit the uplink reference signal using a sending manner or resource predefined by both the base station and the terminal.

According to another embodiment of the present disclosure, a terminal is also provided, including: a second processor and a second communication apparatus; wherein, the second communication apparatus is connected with the second processor, and adapted to receive indication information sent by a base station using high-layer signalling or downlink control signalling, and send the indication information to the second processor; the second processor is adapted to determine to send an uplink reference signal in one or more sending manners indicated by the indication information; or the second communication apparatus is further adapted to send the uplink reference signal using a sending manner or resource predefined by both the base station and the terminal.

According to another embodiment of the present disclosure, a storage medium is also provided. The storage medium is adapted to store program code for performing the following steps:

indicating, by a base station using high-layer signalling or downlink control signalling, a terminal to send an uplink reference signal in one or more sending manners; or sending, by the terminal, the uplink reference signal using a sending manner or resource predefined by both the base station and the terminal.

In an embodiment, the storage medium is adapted to store program code for performing the following step:

receiving, by a terminal, indication information sent by a base station using high-layer signalling or downlink control signalling, and sending an uplink reference signal in one or more sending manners based on the indication information; or sending, by the terminal, the uplink reference signal using a sending manner or resource predefined by both the base station and the terminal.

In the embodiment of the present disclosure, the base station indicates the terminal to send the uplink reference signal in one or more sending manners by using the high-layer signalling or the downlink control signalling; or the terminal sends the uplink reference signal using a sending manner or resource predefined by both the base station and the terminal. Through the above technical solution, the sending manner is set for sending the uplink reference signal between the base station and the terminal, which solves the problem that the technical solution for sending the uplink reference signal is imperfect in the related art, and realizes the transmission of the uplink reference signal accurate and timely.

BRIEF DESCRIPTION OF THE DRAWINGS

The drawings described herein are provided to provide a further understanding of the present disclosure, and are intended to be a part of the present disclosure. The illustrative embodiments of the present disclosure and the description thereof are for explaining the present disclosure and do not constitute an undue limitation of the present disclosure. In the drawing.

DETAILED DESCRIPTION

The present disclosure will be described in detail below with reference to the drawings in combination with the embodiments. It should be noted that the embodiments in the present application and the features in the embodiments may be combined with each other without conflict.

It is to be understood that the terms "first", "second", and the like in the specification, claims, and above drawings of the present disclosure are used to distinguish similar objects, and not necessarily for describing a sequential or chronological order.

Embodiment 1

A mobile communication network (including but not limited to an LTE network) is provided in the embodiment of the present application. The network architecture of the network may include a network side device (such as a base station) and a terminal. The method for sending the uplink reference signal that may be operated on the above network architecture is provided in this embodiment. It should be noted that the operating environment of the method for sending the uplink reference signal provided in the embodiment of the present application is not limited to the above network architecture.

Figure 1:
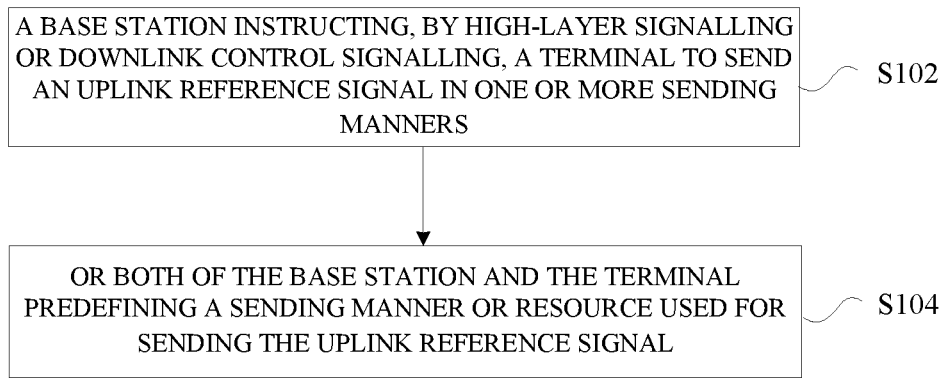
FIG. 1 is a first flowchart of a method for sending an uplink reference signal according to an embodiment of the present disclosure.

FIG. 1 is a first flowchart of a method for sending an uplink reference signal according to an embodiment of the present disclosure. As shown in FIG. 1, steps S102-S104 are included.

In step S102, a base station indicates, by using high-layer signalling or downlink control signalling, a terminal to send an uplink reference signal in one or more sending manners.

In step S104, or, both the base station and the terminal predefined a sending manner or resource used for sending the uplink reference signal.

By adopting the above method and steps, the sending manner is set for transmitting the uplink reference signal between the base station and the terminal, which solves the problem that the technical solution for sending the uplink reference signal is not perfect in the related art, and realizes the accurate and timely transmission of the uplink reference signal.

In an embodiment, the sending manner includes at least one of: a sending beam, a sending antenna, a sending sector, precoding of a sending end, a manner indicated by an antenna port, a manner indicated by an antenna weight vector, a manner indicated by an antenna weight matrix, and space division multiplexing scheme, frequency-domain/time-domain transmission diversity mode, sending sequence, number of layers to be sent, transmission mode, modulation and coding scheme, and manner indicated by reference signals.

In an embodiment, the base station receive the uplink reference signal sent by the terminal in one of the following manner: a receiving beam, a receiving antenna, a receiving antenna panel, a receiving sector, a manner corresponding to a first beam resource, wherein the first beam resource is the beam resource of a first communication node indicated in a quasi co-location of both a reference signal and an antenna port, a manner corresponding to a second beam resource, wherein the second beam resource is a beam resource of the first communication node indicated in the quasi co-location QCL of both a basic reference signal and the antenna port.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the terminal to determine the sending manner of the uplink reference signal based on a downlink receiving manner includes:

taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially;

or, sending, by the terminal, the uplink reference signal from adjacent 2N+1 sending manners on both sides of the basic sending direction sequentially, wherein N is an integer between 1 and 32, including 1 and 32. It should be noted that here, 2N+1 sending manners are selected in the left and right sides of the basic sending direction.

In an embodiment, the information for indicating the terminal to send the uplink reference signal in one or more sending manners includes:

indicating, when a value of the information is 0, the terminal to send the uplink reference signal in a fixed sending manner; and indicating, when the value of the information is 1, the terminal to send the uplink reference signal in the multiple sending manners sequentially;

or, indicating, when the value of the information is 1, the terminal to send the uplink reference signal in a fixed sending manner; and indicating, when a value of the information is 0, the terminal to send the uplink reference signal in the multiple sending manners sequentially.

In an embodiment, the type of the uplink reference signal includes at least one of the following:

reference signals for performing uplink beam scanning;

uplink reference signals for performing uplink beam tracking;

uplink reference signal sent in a specified sending manner or reference signals sent in a specific sending manner;

reference signals for performing uplink coarse beam scanning;

reference signals for performing uplink fine beam scanning;

conventional or general or non-precoded measurement reference signals.

In an embodiment, transmitting the uplink reference signal by the base station and the terminal using a predefined manner includes:

triggering, by the base station using the downlink control signalling, the terminal to send the uplink reference signal, wherein the downlink control signalling carries a downlink sending beam ID or a downlink sending beam index number; and determining, by the terminal, a uplink sending beam ID or a uplink sending beam index number of the uplink reference signal based on the downlink sending beam ID or the downlink sending beam index number.

In an embodiment, transmitting the uplink reference signal by the base station and the terminal using a predefined manner includes: using, by the uplink reference signal, different cyclic shifts and/or different transmission comb indexes when the terminal transmitting the uplink reference signal in different uplink sending beams.

In an embodiment, transmitting the uplink reference signal by the base station and the terminal using a predefined manner includes: transmitting, by the terminal, the uplink reference signal in all time-domain symbols or partial time-domain symbols of a special subframe for the uplink reference signal.

In an embodiment, the partial time-domain symbols includes at least one of:

all symbols in the special subframe other than symbols occupied by a downlink control channel and an uplink control channel; and all time-domain symbols supporting uplink data sending in the special subframe.

In an embodiment, the indicating, by a base station using high-layer signalling, a terminal to send an uplink reference signal in one or more sending manners includes:

configuring, by the base station using the high-layer signalling, a parameter set of the uplink reference signal for the terminal, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the base station configures, by the high-layer signalling, multiple parameter sets of the uplink reference signal for the terminal, and the base station indicates, by the downlink control signalling, whether the terminal triggers the uplink reference signal, and in a case that the uplink reference signal is triggered, one parameter set used for sending the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the base station receives capability parameter information sent by the terminal, wherein the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the base station receives group information of the sending manner reported by the terminal.

In an embodiment, the base station indicates, by the downlink control signalling, the terminal to send the uplink reference signal by using a sending manner in a specified group or a specified sending manner in the specified group.

In an embodiment, the base station configures a resource pool required for a plurality of terminals to send the uplink reference signal, wherein the terminal selects a resource in the resource pool to send the uplink reference signal as desired, wherein a way for the terminal to select the resource is configured by the base station or determined by the terminal according to the identity authentication ID and/or the antenna port number of the terminal.

Figure 2:
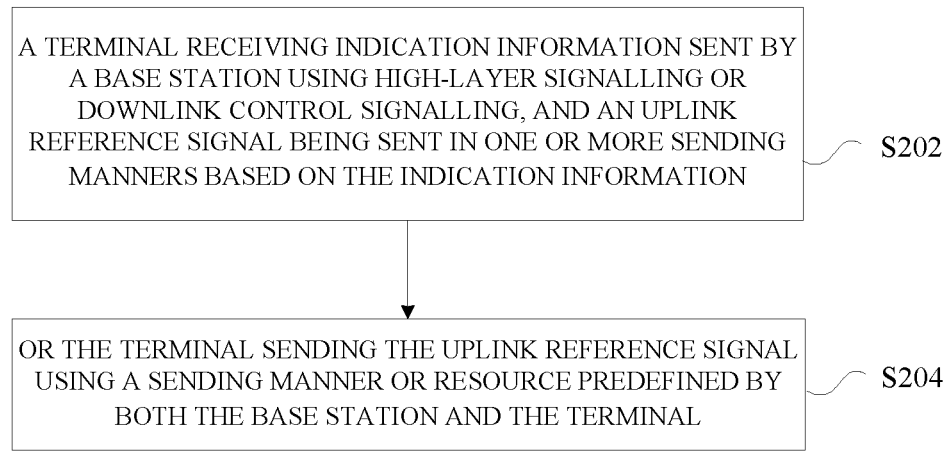
FIG. 2 is a second flowchart of a method for sending an uplink reference signal according to an embodiment of the present disclosure.

FIG. 2 is a second flowchart of a method for sending an uplink reference signal according to an embodiment of the present disclosure. As shown in FIG. 2, steps S202-S204 are included.

In step S202, a terminal receives indication information sent by a base station using high-layer signalling or downlink control signalling, and an uplink reference signal is sent in one or more sending manners based on the indication information.

In step S204, or the terminal sends the uplink reference signal using a sending manner or resource predefined by both the base station and the terminal.

In an embodiment, the sending manner includes at least one of: a sending beam, a sending antenna, a sending sector, precoding of a sending end, a manner indicated by an antenna port, a manner indicated by an antenna weight vector, a manner indicated by an antenna weight matrix, and space division multiplexing scheme, frequency-domain/time-domain transmission diversity mode, sending sequence, number of layers to be sent, transmission mode, modulation and coding scheme, and manner indicated by reference signals.

In an embodiment, the base station receive the uplink reference signal sent by the terminal in one of the following manner: a receiving beam, a receiving antenna, a receiving antenna panel, a receiving sector, a manner corresponding to a first beam resource, wherein the first beam resource is the beam resource of a first communication node indicated in a quasi co-location of both a reference signal and an antenna port, a manner corresponding to a second beam resource, wherein the second beam resource is a beam resource of the first communication node indicated in the quasi co-location QCL of both a basic reference signal and the antenna port.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the terminal to determine the sending manner of the uplink reference signal based on a downlink receiving manner, includes:

taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially;

or, sending, by the terminal, the uplink reference signal from adjacent 2N+1 sending manners of the basic sending direction sequentially, wherein N is an integer between 1 and 32, including 1 and 32.

In an embodiment, the information for indicating the terminal to send the uplink reference signal in one or more sending manners includes:

indicating, when a value of the information is 0, the terminal to send the uplink reference signal in a fixed sending manner; and indicating, when the value of the information is 1, the terminal to send the uplink reference signal in the multiple sending manners sequentially; or indicating, when the value of the information is 1, the terminal to send the uplink reference signal in a fixed sending manner; and indicating, when a value of the information is 0, the terminal to send the uplink reference signal in the multiple sending manners sequentially.

In an embodiment, the type of the uplink reference signal includes at least one of the following:

reference signals for performing uplink beam scanning;

uplink reference signals for performing uplink beam tracking;

uplink reference signal sent in a specified sending manner or reference signals sent in a specific sending manner;

reference signals for performing uplink coarse beam scanning;

reference signals for performing uplink fine beam scanning;

conventional or general or non-precoded measurement reference signals.

In an embodiment, the sending, by the terminal, the uplink reference signal using a sending manner or resource predefined by both the base station and the terminal includes:

triggering, by the terminal, sending of the uplink reference signal based on the downlink control signalling sent by the base station, wherein the downlink control signalling carries a downlink sending beam ID or a downlink sending beam index number; and determining, by the terminal, a uplink sending beam ID or a uplink sending beam index number of the uplink reference signal based on the downlink sending beam ID or the downlink sending beam index number.

In an embodiment, the sending, by the terminal, the uplink reference signal using a sending manner or resource predefined by both the base station and the terminal includes: using, by the uplink reference signal, different cyclic shifts and/or different transmission comb indexes when the terminal transmitting the uplink reference signal in different uplink sending beams.

In an embodiment, the sending, by the terminal, the uplink reference signal using a sending manner or resource predefined by both the base station and the terminal includes: transmitting, by the terminal, the uplink reference signal in all time-domain symbols or partial time-domain symbols of a special subframe for the uplink reference signal.

In an embodiment, the partial time-domain symbols includes at least one of:

all symbols in the special subframe other than symbols occupied by a downlink control channel and an uplink control channel; and all time-domain symbols supporting uplink data sending in the special subframe.

In an embodiment, the receiving, by a terminal, indication information sent by a base station using high-layer signalling, and sending an uplink reference signal in one or more sending manners based on the indication information includes:

configuring, by the terminal, a parameter set of the uplink reference signal based on the high-layer signalling, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the terminal configures multiple parameter sets of the uplink reference signal based on the high-layer signalling sent by the base station, the terminal determines whether the uplink reference signal is triggered based on the downlink control signalling sent by the base station, and in a case that the uplink reference signal is triggered, one parameter set used for sending the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the terminal sends capability parameter information to the base station, wherein the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the terminal reports group information of the sending manner to the base station.

In an embodiment, the terminal sends the uplink reference signal using a sending manner in a specified group indicated by the base station using the downlink control signalling or a specified sending manner in the specified group.

In an embodiment, the terminal selects a resource in a resource pool to send the uplink reference signal as desired, wherein the base station configures the resource pool required for a plurality of terminals to send the uplink reference signal, wherein a way for the terminal to select the resource is configured by the base station or determined by the terminal according to the identity authentication ID and/or the antenna port number of the terminal.

The detailed description is made below in combination with the specific embodiments of the present disclosure.

In order to understand the features and technical contents of the embodiments of the present disclosure, the implementation of the embodiments of the present disclosure will be described in detail below in combination with the specific embodiments of the present disclosure.

The uplink reference signal involved in the present application may include: a measurement reference signal and an uplink demodulation reference signal.

The base station may include: a macro base station, a micro base station, a sending and receiving node, and a transmission node.

Specific Embodiment 1

The base station indicates, by using the high-layer signalling or the downlink control signalling, the user terminal to send the uplink reference signal in one or more sending manners, wherein the sending manner includes at least one of: a sending beam, a sending antenna, a sending sector, precoding of a sending end, a manner indicated by an antenna port, a manner indicated by an antenna weight vector, a manner indicated by an antenna weight matrix, and space division multiplexing scheme, frequency-domain/time-domain transmission diversity mode, sending sequence, number of layers to be sent, transmission mode, modulation and coding scheme, and manner indicated by reference signals.

Further, the information carried by the downlink control signalling includes: information for indicating the user terminal to determine the sending manner of the uplink reference signal based on a downlink receiving manner, wherein the receiving manner includes: a receiving beam, a receiving antenna, and a receiving sector.

Further, the user terminal to determine the sending manner of the uplink reference signal based on a downlink receiving manner include: taking a direction of the receiving manner as a basic sending direction for sending the uplink reference signal, and sending, by the user terminal, the uplink reference signal from an Nth sending manner in a left direction of the basic sending direction to an Nth sending manner in a right direction sequentially, or sending, by the user terminal, the uplink reference signal from adjacent 2N+1 sending manners of the basic sending direction sequentially, wherein N is an integer between 1 and 32, including 1 and 32.

For example, the base station indicates, by using the downlink control signalling, the user terminal to determine the sending manner of the uplink reference signal based on the downlink receiving manner. It is assumed that the receiving beam used by the user terminal to receive the downlink signal is the receiving beam 5, the uplink sending beam corresponding to channel reciprocity or partial channel reciprocity is the sending beam 5. It is assumed that the value of N predefined by the base station and the user terminal is 2, and based on proximity relationship, number sequence of the sending beam is: sending beam 1, sending beam 2, sending beam 3, sending beam 4, sending beam 5, sending beam 6, sending beam 7, and sending beam 8, the user terminal sends the uplink reference signal on the sending beam 1, the sending beam 2, the sending beam 3, the sending beam 4, the sending beam 5, the sending beam 6, and the sending beam 7 sequentially. Therefore, the base station can implement scanning of the uplink sending beam in this way.

It should be noted that, in the present application, the sending beam, the sending antenna, and the sending sector have the meanings of is sent in the form of a beam, sent in the form of an antenna, and sent in the form of a sector respectively. Similarly, the receiving beam, the receiving antenna, and the receiving sector have the meanings of is received in the form of a beam, received in the form of an antenna, and received in the form of a sector respectively.

Specific Embodiment 2

The base station indicates, by using the downlink control signalling, whether the user terminal sends the uplink reference signal in one or more sending manners. For example, when bit value of the indication information carried in the downlink control signalling is 1, it denotes that that the user terminal is indicated to send the uplink reference signal multiple times on the same sending beam. When bit value of the indication information carried in the downlink control signalling is 0, it denotes that that the user terminal is indicated to send the uplink reference signal on multiple sending beams sequentially. Alternatively, when bit value of the indication information carried in the downlink control signalling is 0, it denotes that that the user terminal is indicated to send the uplink reference signal multiple times on the same sending beam. When bit value of the indication information carried in the downlink control signalling is 1, it denotes that that the user terminal is indicated to send the uplink reference signal on multiple sending beams sequentially.

Further, the number of the multiple sending beams may be determined by the user terminal according to its own sending antenna configuration or capability, or configured by the base station through signalling. Or the base station determines the number of the sending beam by means of signalling activation and deactivation.

Specific Embodiment 3

Due to the diversity of antenna configuration and sending capabilities of the UE, the number of uplink sending beams supported by different UEs may varies greatly. It is assumed that the base station is unsure of the antenna configuration and capability level of the UE, it is difficult for the base station to directly determine, by signalling indication, the number of uplink beam scans and the best sending beam ID or sending beam index indicated by the signalling, it can be considered to indicate in an implicit way at this time. For example, when the UE sends SRS in the uplink, the SRS sequence using different cyclic shifts and/or transmission combs is sent on different sending beams, and the base station could perform correlation detection on the received SRS to determine the cyclic shift and/or the transmission comb having the highest correlation peak, and then indicate the value of the cyclic shift and/or the transmission comb to the UE by signalling, then the UE end could implicitly obtain the best uplink sending beam through the value of the cyclic shift and/or the transmission comb.

Specific Embodiment 4

The base station directly indicates the type of the uplink reference signal triggered by the downlink control signalling;

Or, the base station configures multiple uplink reference signal parameter sets for the user terminal by using the high-layer signalling, wherein the parameter set includes the type parameter of the uplink reference signal, and the base station indicates the user terminal to use one of these sets of parameters to send the uplink reference signal through the downlink control signalling, thus realizing the function of dynamically triggering the uplink reference signal type.

Further, the type of the uplink reference signal includes at least one of the following: reference signals for performing uplink beam scanning, uplink reference signals for performing uplink beam tracking, uplink reference signal sent in a specified sending manner or reference signals sent in a specific sending manner, reference signals for performing uplink coarse beam scanning, and reference signals for performing uplink fine beam scanning.

For example, the base station configures three sets of SRS parameter sets for the user terminal through high-level signalling, which are parameter set 1, parameter set 2, and parameter set 3 respectively, wherein the uplink reference signal type in the parameter set 1 is an reference signal for performing uplink beam scanning. The uplink reference signal in the parameter set 2 is an uplink reference signal for performing uplink beam tracking, and the uplink reference signal type in parameter set 3 is an uplink reference signal sent in a specified sending manner, and then the base station could dynamically trigger the type of SRS through the downlink control signalling state shown in table 1. Table 1 is an SRS request field description table of downlink control signalling according to a fourth embodiment of the present disclosure, as shown in Table 1:

TABLE 1

| Value of SRS request field | Description |
| --- | --- |
| 00 | Without triggering SRS |
| 01 | Triggering SRS and using SRS parameter set 1 |
| 10 | Triggering SRS and using SRS parameter set 2 |
| 11 | Triggering SRS and using SRS parameter set 3 |

Specific Embodiment 5

The predefining, by both the base station and the user terminal, a sending manner or resource used for sending the uplink reference signal includes: triggering, by the base station using the downlink control signalling, the user terminal to send the uplink reference signal, wherein the downlink control signalling carries a downlink sending beam ID or a downlink sending beam index number; and determining, by the user terminal, a uplink sending beam ID or a uplink sending beam index number of the uplink reference signal based on the downlink sending beam ID or the downlink sending beam index number.

Specific Embodiment 6

The base station indicates the type of uplink reference signal triggered by the user terminal through the downlink control signalling, wherein the type of the uplink reference signal includes: an SRS sent by using a wide beam or a coarse beam, an SRS sent by using a narrow beam or a fine beam, a conventional or a general or a non-precoded SRS.

For example, the base station triggers and indicates the SRS type by using 2-bit downlink control signalling, which is shown in Table 2 below. Table 2 is a description table of SRS request type field of downlink control signalling according to Embodiment 6 of the present disclosure, as shown in Table 2:

TABLE 2

| Value of SRS request type field | Description |
| --- | --- |
| 00 | Without triggering SRS |
| 01 | Triggering SRS of coarse beam |
| 10 | Triggering SRS of fine beam |
| 11 | Triggering conventional SRS |

For each type of SRS, there are multiple parameter sets for its corresponding high-layer signalling configuration. For the SRS of the coarse beam, the configured parameter set includes the parameter beam ID or the beam index number; for the SRS of the fine beam, the configured parameter set includes the parameter antenna port number.

Specific Embodiment 7

The user terminal reports capability parameter information to the base station, wherein the capability parameter information includes at least one of: number of transmission and reception units TXRUs that the user terminal can support or number of the sending manners that the user terminal can support simultaneously, number of the sending manners required to cover an entire cell, or number of antenna elements of total TXRUs and/or per TXRU; and number of fine sending beams corresponding to each coarse sending beam.

Wherein, the number of the sending manners required to cover an entire cell or the number of antenna elements of total TXRUs and/or per TXRU may be candidate values of a plurality of predefined beams, such as 1, 5, 10, 20, and 40, etc.

Wherein, the number of fine sending beams corresponding to each coarse sending beam may be predefined values, such as 1, 2, 4, and 8, etc. Wherein 1 denotes that it is not necessary to refine the coarse beam, and 4 denotes that one coarse beam could be refined into 4 fine beams.

Through the description of the above embodiments, those skilled in the art can clearly understand that the method according to the above embodiment can be implemented by means of software plus a necessary general hardware platform, and certainly, by hardware, but in many cases, the former is a better implementation. Based on this concept, the spirit of the technical solutions of the embodiments of the disclosure or, in other words, the contents which contribute to improve the prior art may be embodied by means of computer software products that may be stored in storage media (such as ROM/RAM, magnetic disk, optical disc, etc.) and which include several instructions to make a computer apparatus (which may be a cellphone, computer, server or network device, etc.) execute various embodiments of the present disclosure.

Embodiment 2

In the embodiment, an apparatus for sending an uplink reference signal is provided, which is used to implement the foregoing embodiments and preferred embodiments, and details are not described herein. As used below, the term "module" may implement a combination of software and/or hardware of a predetermined function. Although the apparatus described in the following embodiments are preferably implemented in software, hardware, or a combination of software and hardware, is also possible and contemplated.

In the present embodiment 2, an apparatus for sending uplink reference signal applied to a base station is provided, and the apparatus includes an indication module.

The indication module is adapted to indicate, by using high-layer signalling or downlink control signalling, a terminal to send an uplink reference signal in one or more sending manners; or, send, by the terminal, the uplink reference signal by using a sending manner or resource predefined by both the terminal and the base station.

In an embodiment, the sending manner includes at least one of: a sending beam, a sending antenna, a sending sector, precoding of a sending end, a manner indicated by an antenna port, a manner indicated by an antenna weight vector, a manner indicated by an antenna weight matrix, and space division multiplexing scheme, frequency-domain/time-domain transmission diversity mode, sending sequence, number of layers to be sent, transmission mode, modulation and coding scheme, and manner indicated by reference signals.

In an embodiment, the base station receive the uplink reference signal sent by the terminal in one of the following manner: a receiving beam, a receiving antenna, a receiving antenna panel, a receiving sector, a manner corresponding to a first beam resource, wherein the first beam resource is the beam resource of a first communication node indicated in a quasi co-location of both a reference signal and an antenna port, a manner corresponding to a second beam resource, wherein the second beam resource is a beam resource of the first communication node indicated in the quasi co-location QCL of both a basic reference signal and the antenna port.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the terminal to determine the sending manner of the uplink reference signal based on a downlink receiving manner includes:

taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially; or sending, by the terminal, the uplink reference signal from adjacent 2N+1 sending manners on both sides of the basic sending direction sequentially, wherein N is an integer between 1 and 32, including 1 and 32.

In an embodiment, the information for indicating the terminal to send the uplink reference signal in one or more sending manners includes:

indicating, when a value of the information is 0, the terminal to send the uplink reference signal in a fixed sending manner; and indicating, when the value of the information is 1, the terminal to send the uplink reference signal in the multiple sending manners sequentially; or indicating, when the value of the information is 1, the terminal to send the uplink reference signal in a fixed sending manner; and indicating, when a value of the information is 0, the terminal to send the uplink reference signal in the multiple sending manners sequentially.

In an embodiment, the type of the uplink reference signal includes at least one of the following:

reference signals for performing uplink beam scanning;

uplink reference signals for performing uplink beam tracking;

uplink reference signal sent in a specified sending manner or reference signals sent in a specific sending manner;

reference signals for performing uplink coarse beam scanning;

reference signals for performing uplink fine beam scanning;

conventional or general or non-precoded measurement reference signals.

In an embodiment, the indication module includes: the sending, by the terminal, the uplink reference signal by using a sending manner or resource predefined by both the terminal and the base station including: triggering, by the base station using the downlink control signalling, the terminal to send the uplink reference signal, wherein the downlink control signalling carries a downlink sending beam ID or a downlink sending beam index number; and determining, by the terminal, a uplink sending beam ID or a uplink sending beam index number of the uplink reference signal based on the downlink sending beam ID or the downlink sending beam index number.

In an embodiment, the indication module includes: the sending, by the terminal, the uplink reference signal by using a sending manner or resource predefined by both the terminal and the base station including: using, by the uplink reference signal, different cyclic shifts and/or different transmission comb indexes when the terminal transmitting the uplink reference signal in different uplink sending beams.

In an embodiment, the indication module includes: the sending, by the base station, the uplink reference signal by using a sending manner or resource predefined by both the terminal and the base station including: transmitting, by the terminal, the uplink reference signal in all time-domain symbols or partial time-domain symbols of a special subframe for the uplink reference signal.

In an embodiment, the partial time-domain symbols includes at least one of:

all symbols in the special subframe other than symbols occupied by a downlink control channel and an uplink control channel; and all time-domain symbols supporting uplink data sending in the special subframe.

In an embodiment, the indication module includes: indicating, by the base station using high-layer signalling, a terminal to send an uplink reference signal in one or more sending manners, including:

configuring, by the base station using the high-layer signalling, a parameter set of the uplink reference signal for the terminal, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the base station configures, by the high-layer signalling, multiple parameter sets of the uplink reference signal for the terminal, and the base station indicates, by the downlink control signalling, whether the terminal triggers the uplink reference signal, and in a case that the uplink reference signal is triggered, one parameter set adapted to send the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the base station receives capability parameter information sent by the terminal, wherein the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the base station receives group information of the sending manner reported by the terminal.

In an embodiment, the base station indicates, by the downlink control signalling, the terminal to send the uplink reference signal by using a sending manner in a specified group or a specified sending manner in the specified group.

In an embodiment, the base station configures a resource pool required for a plurality of terminals to send the uplink reference signal, wherein the terminal selects a resource in the resource pool to send the uplink reference signal as desired, wherein an apparatus for the terminal to select the resource is configured by the base station or determined by the terminal according to the identity authentication ID and/or the antenna port number of the terminal.

Based on another embodiment of the present disclosure, an apparatus for sending uplink reference signal applied to a terminal is provided, and the apparatus includes an indication receiving module.

The indication receiving module is adapted to receive indication information sent by a base station using high-layer signalling or downlink control signalling, and send an uplink reference signal in one or more sending manners based on the indication information; or send, by the terminal, the uplink reference signal using a sending manner or resource predefined by both the base station and the terminal.

In an embodiment, the sending manner includes at least one of: a sending beam, a sending antenna, a sending sector, precoding of a sending end, a manner indicated by an antenna port, a manner indicated by an antenna weight vector, a manner indicated by an antenna weight matrix, and space division multiplexing scheme, frequency-domain/time-domain transmission diversity mode, sending sequence, number of layers to be sent, transmission mode, modulation and coding scheme, and manner indicated by reference signals.

In an embodiment, the base station receive the uplink reference signal sent by the terminal in one of the following manner: a receiving beam, a receiving antenna, a receiving antenna panel, a receiving sector, a manner corresponding to a first beam resource, wherein the first beam resource is the beam resource of a first communication node indicated in a quasi co-location of both a reference signal and an antenna port, a manner corresponding to a second beam resource, wherein the second beam resource is a beam resource of the first communication node indicated in the quasi co-location QCL of both a basic reference signal and the antenna port.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the terminal to determine the sending manner of the uplink reference signal based on a downlink receiving manner, includes:

taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially; or sending, by the terminal, the uplink reference signal from adjacent 2N+1 sending manners of the basic sending direction sequentially, wherein N is an integer between 1 and 32, including 1 and 32.

In an embodiment, the information for indicating the terminal to send the uplink reference signal in one or more sending manners includes:

indicating, when a value of the information is 0, the terminal to send the uplink reference signal in a fixed sending manner; and indicating, when the value of the information is 1, the terminal to send the uplink reference signal in the multiple sending manners sequentially; or indicating, when the value of the information is 1, the terminal to send the uplink reference signal in a fixed sending manner; and indicating, when a value of the information is 0, the terminal to send the uplink reference signal in the multiple sending manners sequentially.

In an embodiment, the type of the uplink reference signal includes at least one of the following:

reference signals for performing uplink beam scanning;

uplink reference signals for performing uplink beam tracking;

uplink reference signal sent in a specified sending manner or reference signals sent in a specific sending manner;

reference signals for performing uplink coarse beam scanning;

reference signals for performing uplink fine beam scanning;

conventional or general or non-precoded measurement reference signals.

In an embodiment, the indication receiving module includes sending, by the terminal, the uplink reference signal using a sending manner or resource predefined by both the base station and the terminal, including:

triggering, by the terminal, sending of the uplink reference signal based on the downlink control signalling sent by the base station, wherein the downlink control signalling carries a downlink sending beam ID or a downlink sending beam index number; and determining, by the terminal, a uplink sending beam ID or a uplink sending beam index number of the uplink reference signal based on the downlink sending beam ID or the downlink sending beam index number.

In an embodiment, the indication receiving module includes sending, by the terminal, the uplink reference signal using a sending manner or resource predefined by both the base station and the terminal, including: using, by the uplink reference signal, different cyclic shifts and/or different transmission comb indexes when the terminal transmitting the uplink reference signal in different uplink sending beams.

In an embodiment, the indication receiving module includes sending, by the base station, the uplink reference signal using a sending manner or resource predefined by both the base station and the terminal, including: transmitting, by the terminal, the uplink reference signal in all time-domain symbols or partial time-domain symbols of a special subframe for the uplink reference signal.

In an embodiment, the indication receiving module includes the partial time-domain symbols including at least one of:

all symbols in the special subframe other than symbols occupied by a downlink control channel and an uplink control channel; and all time-domain symbols supporting uplink data sending in the special subframe.

In an embodiment, the indication receiving module includes: receiving, by a terminal, indication information sent by a base station using high-layer signalling, and sending an uplink reference signal in one or more sending manners based on the indication information including:

configuring, by the terminal, a parameter set of the uplink reference signal based on the high-layer signalling, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the terminal configures multiple parameter sets of the uplink reference signal based on the high-layer signalling sent by the base station, the terminal determines whether the uplink reference signal is triggered based on the downlink control signalling sent by the base station, and in a case that the uplink reference signal is triggered, one parameter set used for sending the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the terminal sends capability parameter information to the base station, wherein the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the terminal reports group information of the sending manner to the base station.

In an embodiment, the terminal sends the uplink reference signal using a sending manner in a specified group indicated by the base station using the downlink control signalling or a specified sending manner in the specified group.

In an embodiment, the terminal selects a resource in a resource pool to send the uplink reference signal as desired, wherein the base station configures the resource pool required for a plurality of terminals to send the uplink reference signal, wherein a way for the terminal to select the resource is configured by the base station or determined by the terminal according to the identity authentication ID and/or the antenna port number of the terminal.

It should be noted that each of the above modules may be implemented by software or hardware. For the latter, it may be implemented in the following way, but not limited to: the above modules is all located in the same processor; or, each of the above modules is located on a separate processor in any combination.

Embodiment 3

According to another embodiment of the present disclosure, a system for sending an uplink reference signal is further provided, including: a base station and a terminal.

The base station indicates the terminal to send an uplink reference signal in one or more sending manners by using high-layer signalling or downlink control signaling.

Or, the terminal sends the uplink reference signal by using a sending manner or resource predefined by both the terminal and the base station.

In an embodiment, the sending manner includes at least one of: a sending beam, a sending antenna, a sending sector, precoding of a sending end, a manner indicated by an antenna port, a manner indicated by an antenna weight vector, a manner indicated by an antenna weight matrix, and space division multiplexing scheme, frequency-domain/time-domain transmission diversity mode, sending sequence, number of layers to be sent, transmission mode, modulation and coding scheme, and manner indicated by reference signals.

In an embodiment, the base station receive the uplink reference signal sent by the terminal in one of the following manner: a receiving beam, a receiving antenna, a receiving antenna panel, a receiving sector, a manner corresponding to a first beam resource, wherein the first beam resource is the beam resource of a first communication node indicated in a quasi co-location of both a reference signal and an antenna port, a manner corresponding to a second beam resource, wherein the second beam resource is a beam resource of the first communication node indicated in the quasi co-location QCL of both a basic reference signal and the antenna port.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the terminal to determine the sending manner of the uplink reference signal based on a downlink receiving manner includes:

taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially;

or, sending, by the terminal, the uplink reference signal from adjacent 2N+1 sending manners on both sides of the basic sending direction sequentially, wherein N is an integer between 1 and 32, including 1 and 32.

In an embodiment, the information for indicating the terminal to send the uplink reference signal in one or more sending manners includes:

indicating, when a value of the information is 0, the terminal to send the uplink reference signal in a fixed sending manner; and indicating, when the value of the information is 1, the terminal to send the uplink reference signal in the multiple sending manners sequentially; or indicating, when the value of the information is 1, the terminal to send the uplink reference signal in a fixed sending manner; and indicating, when a value of the information is 0, the terminal to send the uplink reference signal in the multiple sending manners sequentially.

In an embodiment, the type of the uplink reference signal includes at least one of the following:

reference signals for performing uplink beam scanning;

uplink reference signals for performing uplink beam tracking;

uplink reference signal sent in a specified sending manner or reference signals sent in a specific sending manner;

reference signals for performing uplink coarse beam scanning;

reference signals for performing uplink fine beam scanning;

conventional or general or non-precoded measurement reference signals.

In an embodiment, the sending, by the terminal, the uplink reference signal by using a sending manner or resource predefined by both the terminal and the base station includes:

triggering, by the base station using the downlink control signalling, the terminal to send the uplink reference signal, wherein the downlink control signalling carries a downlink sending beam ID or a downlink sending beam index number; and determining, by the terminal, a uplink sending beam ID or a uplink sending beam index number of the uplink reference signal based on the downlink sending beam ID or the downlink sending beam index number.

In an embodiment, the sending, by the terminal, the uplink reference signal by using a sending manner or resource predefined by both the terminal and the base station includes: using, by the uplink reference signal, different cyclic shifts and/or different transmission comb indexes when the terminal transmitting the uplink reference signal in different uplink sending beams.

In an embodiment, the sending, by the base station, the uplink reference signal by using a sending manner or resource predefined by both the terminal and the base station includes: transmitting, by the terminal, the uplink reference signal in all time-domain symbols or partial time-domain symbols of a special subframe for the uplink reference signal.

In an embodiment, the partial time-domain symbols includes at least one of:

all symbols in the special subframe other than symbols occupied by a downlink control channel and an uplink control channel; and all time-domain symbols supporting uplink data sending in the special subframe.

In an embodiment, the indicating, by a base station using high-layer signalling, a terminal to send an uplink reference signal in one or more sending manners includes:

configuring, by the base station using the high-layer signalling, a parameter set of the uplink reference signal for the terminal, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the base station configures, by the high-layer signalling, multiple parameter sets of the uplink reference signal for the terminal, and the base station indicates, by the downlink control signalling, whether the terminal triggers the uplink reference signal, and in a case that the uplink reference signal is triggered, one parameter set adapted to send the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the base station receives capability parameter information sent by the terminal, wherein the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the base station receives group information of the sending manner reported by the terminal.

In an embodiment, the base station indicates, by the downlink control signalling, the terminal to send the uplink reference signal by using a sending manner in a specified group or a specified sending manner in the specified group.

In an embodiment, the base station configures a resource pool required for a plurality of terminals to send the uplink reference signal, wherein the terminal selects a resource in the resource pool to send the uplink reference signal as desired, wherein a way for the terminal to select the resource is configured by the base station or determined by the terminal according to the identity authentication ID and/or the antenna port number of the terminal.

Embodiment 4

Figure 3:
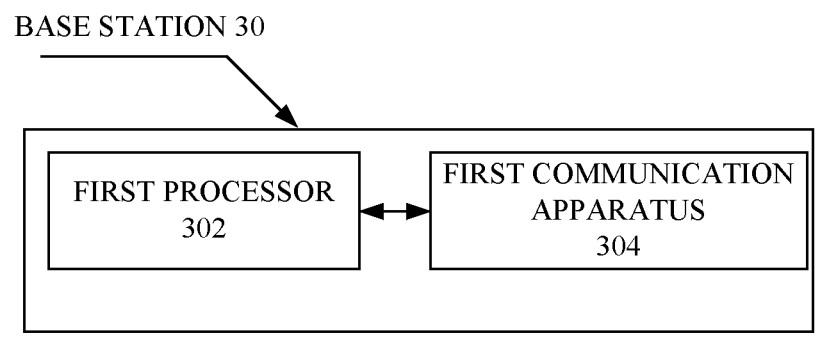
FIG. 3 is a block diagram of a base station according to an embodiment of the present disclosure.

FIG. 3 is a block diagram of a base station according to an embodiment of the present disclosure, as shown in FIG. 3, the base station 30 includes: a first processor 302 and a first communication apparatus 304.

The first processor 302 is adapted to determine an indication information for indicating a terminal to send an uplink reference signal in one or more sending manners;

The first communication apparatus 304 is connected with the first processor 302, adapted to send the indication information to the terminal by using high-layer signalling or downlink control signaling.

Or, the first communication apparatus 304 is further adapted to transmit the uplink reference signal using a sending manner or resource predefined by both the base station and the terminal.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the first communication apparatus 304 is further adapted to trigger the terminal to send an uplink reference signal by using the downlink control signaling, wherein, the downlink control signalling carries a downlink sending beam ID or a downlink sending beam index number; and the terminal determines a uplink sending beam ID or a uplink sending beam index number of the uplink reference signal based on the downlink sending beam ID or the downlink sending beam index number.

In an embodiment, the first communication apparatus 304 is further adapted to transmit the uplink reference signal by using a sending manner or resource predefined by both the terminal and the base station, which includes: using, by the uplink reference signal, different cyclic shifts and/or different transmission comb indexes when the terminal transmitting the uplink reference signal in different uplink sending beams.

In an embodiment, the first communication apparatus 304 is further adapted to transmit the uplink reference signal by using a sending manner or resource predefined by both the terminal and the base station, which includes: transmitting, by the terminal, the uplink reference signal in all time-domain symbols or partial time-domain symbols of a special subframe for the uplink reference signal.

In an embodiment, the first communication apparatus 304 sends the indication information to the terminal by using the high-layer signalling, including:

configuring, by the first communication apparatus 304 using the high-layer signalling, a parameter set of the uplink reference signal for the terminal, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the first communication apparatus 304 configures a parameter set of the uplink reference signal for the terminal by using the high-layer signalling, and the base station indicates, by the downlink control signalling, whether the terminal triggers the uplink reference signal, and in a case that the uplink reference signal is triggered, one parameter set used for sending the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the first communication apparatus 304 receives capability parameter information sent by the terminal, wherein the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the first communication apparatus 304 receives group information of the sending manner reported by the terminal.

In an embodiment, the base station configures a resource pool required for a plurality of terminals to send the uplink reference signal, wherein the terminal selects a resource in the resource pool to send the uplink reference signal as desired, wherein a way for the terminal to select the resource is configured by the base station or determined by the terminal according to the identity authentication ID and/or the antenna port number of the terminal.

Figure 4:
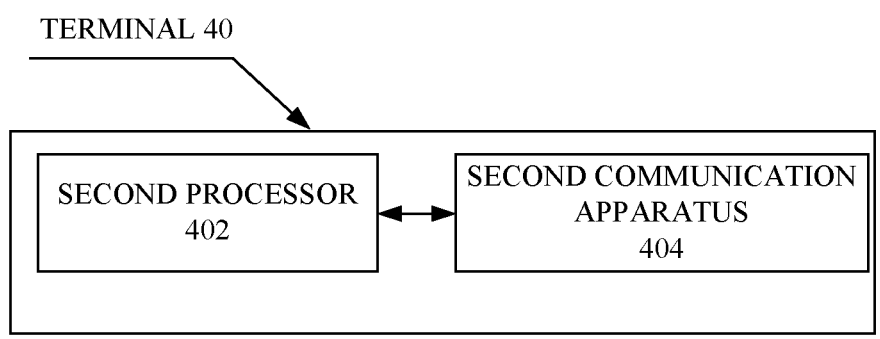
FIG. 4 is a block diagram of a terminal according to an embodiment of the present disclosure.

FIG. 4 is a block diagram of a terminal according to an embodiment of the present disclosure. As shown in FIG. 4, the terminal 40 includes: a second processor 402 and a second communication apparatus 404.

The second communication apparatus 404 is connected with the second processor 402, and adapted to receive indication information sent by a base station using high-layer signalling or downlink control signalling, and send the indication information to the second processor 402.

The second processor 402 is adapted to determine to send an uplink reference signal in one or more sending manners indicated by the indication information.

Or, the second communication apparatus 404 is further adapted to send the uplink reference signal using a sending manner or resource predefined by both the base station and the terminal.

In an embodiment, information carried by the downlink control signalling includes at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

In an embodiment, the sending the uplink reference signal using a sending manner or resource predefined by both the base station and the terminal includes:

triggering, by the terminal, sending of the uplink reference signal based on the downlink control signalling sent by the base station, wherein the downlink control signalling carries a downlink sending beam ID or a downlink sending beam index number; and determining, by the terminal, a uplink sending beam ID or a uplink sending beam index number of the uplink reference signal based on the downlink sending beam ID or the downlink sending beam index number.

In an embodiment, the sending the uplink reference signal using a sending manner or resource predefined by both the base station and the terminal includes: using, by the uplink reference signal, different cyclic shifts and/or different transmission comb indexes when the second communication apparatus 404 transmitting the uplink reference signal in different uplink sending beams.

In an embodiment, the sending the uplink reference signal using a sending manner or resource predefined by both the base station and the terminal includes: transmitting, by the second communication apparatus 404, the uplink reference signal in all time-domain symbols or partial time-domain symbols of a special subframe for the uplink reference signal.

In an embodiment, the receiving, by the second communication apparatus 404, indication information sent by a base station using high-layer signalling or downlink control signaling includes:

configuring, by the base station, a parameter set of the uplink reference signal based on the high-layer signalling, wherein the parameter set includes at least one of:

an uplink sending beam ID or index number, a type of the uplink reference signal, a sending antenna port number of the uplink reference signal, a transmission comb index number of the uplink reference signal, and a time-domain position or time-domain symbol of the uplink reference signal.

In an embodiment, the terminal configures multiple parameter sets of the uplink reference signal based on the high-layer signalling sent by the base station, it is determined whether the uplink reference signal is triggered based on the downlink control signalling sent by the base station, and in a case that the uplink reference signal is triggered, one parameter set used for sending the uplink reference signal is selected from the multiple parameter sets, wherein the parameter set includes at least one of: an uplink sending beam ID or index number, a type of the uplink reference signal, and a sending antenna port number of the uplink reference signal.

In an embodiment, the terminal sends capability parameter information to the base station by the second communication apparatus 404, the capability parameter information includes at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

In an embodiment, the base station and the terminal are predefined to divide the sending manner into a plurality of groups, or the terminal reports group information of the sending manner to the base station.

In an embodiment, the terminal selects a resource in a resource pool to send the uplink reference signal as desired by the second communication apparatus 404, wherein the base station configures the resource pool required for a plurality of terminals to send the uplink reference signal, wherein a way for the terminal to select the resource is configured by the base station or determined by the terminal according to the identity authentication ID and/or the antenna port number of the terminal.

Embodiment 5

Embodiments of the present disclosure also provide a storage medium. Alternatively, in the embodiment, the above storage medium may be adapted to store program code for performing step S1.

In step S1, a base station indicates, by using high-layer signalling or downlink control signalling, a terminal to send an uplink reference signal in one or more sending manners; or both the base station and the terminal predefines a sending manner or resource used for sending the uplink reference signal.

In an embodiment, the storage medium may be adapted to store program code for performing step S2.

In step S2, a terminal receives indication information sent by a base station using high-layer signalling or downlink control signalling, and sending an uplink reference signal in one or more sending manners based on the indication information; or the terminal sends the uplink reference signal using a sending manner or resource predefined by both the base station and the terminal.

In an embodiment, the above storage medium may include, but not limited to, a USB flash drive, a Read-Only Memory (ROM), a Random Access Memory (RAM), a mobile hard disk, magnetic disks, or optical disks and various mediums capable of storing program codes.

In an embodiment, the processor executes the method steps described in the above embodiments according to the program code stored in the storage medium.

In an embodiment, specific examples in this embodiment may refer to the examples described in the above embodiment and alternate embodiment, and details are not described herein again in this embodiment.

Obviously, those skilled in the art should understand each of the foregoing modules or steps of the present disclosure may be realized with general computing devices, they may be concentrated on a single computing device, or distributed in a network constituted by a plurality of computing devices, optionally they may be realized with program codes executable by computing devices, thereby they may be stored in storage devices and executed by computing devices, in some cases, the steps shown or described may be performed in an order different from that herein, or they may be separately made into individual integrated circuit modules, or a plurality of modules or steps among them are made into a single integrated circuit module to achieve. Thus, this disclosure is not limited to any particular combination of hardware and software.

The above description is only a preferred embodiment of the present disclosure, and is not intended to limit the disclosure, and various changes and modifications of the present disclosure are possible to those skilled in the art. Any modification, equivalent replacement and improve and the like within the spirit and principle of the disclosure should be contained in the scope of the disclosure.

INDUSTRIAL APPLICABILITY

In the embodiment of the present disclosure, the base station indicates the terminal to send the uplink reference signal in one or more sending manners by using the high-layer signalling or the downlink control signalling; or the terminal sends the uplink reference signal using a sending manner or resource predefined by both the base station and the terminal. Through the above technical solution, the sending manner is set for sending the uplink reference signal between the base station and the terminal, which solves the problem that the technical solution for sending the uplink reference signal is imperfect in the related art, and realizes the transmission of the uplink reference signal accurate and timely.

What is claimed is:

1. A method for sending an uplink reference signal, comprising:
   indicating, by a base station using high-layer signalling or downlink control signalling, a terminal to send an uplink reference signal in one or more sending manners; or
   predefining, by both the base station and the terminal, a sending manner or resource used for sending the uplink reference signal,
   wherein, the base station configures a resource pool required for a plurality of terminals to send the uplink reference signal, causing the terminal to select a resource in the resource pool to send the uplink reference signal as desired, wherein a way for the terminal to select the resource is configured by the base station or determined by the terminal according to an identity authentication ID and/or an antenna port number of the terminal.

2. The method of claim 1, wherein information carried by the downlink control signalling comprises at least one of:
   information for indicating the terminal to determine the sending manner of the uplink reference signal based on a downlink receiving manner;
   information for indicating the terminal to send the uplink reference signal in one or more sending manners;
   information for indicating type of the uplink reference signal triggered by the terminal;
   information for indicating the terminal to send the uplink reference signal for one or more times; and
   information for indicating whether the terminal triggers sending of the uplink reference signal, and the terminal to select a sending manner or a parameter set to trigger from multiple sending manners or parameter sets.

3. The method of claim 2, wherein the terminal determining the sending manner of the uplink reference signal based on a downlink receiving manner, comprises:
   taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially; or
   sending, by the terminal, the uplink reference signal from adjacent 2N+1 sending manners on both sides of the basic sending direction sequentially, wherein N is a integer and 1≤N≤32.

4. The method of claim 2, wherein, the information for indicating the terminal to send the uplink reference signal in one or more sending manners comprises:
   indicating, when a value of the information is 0, the terminal to send the uplink reference signal in a fixed sending manner; and indicating, when the value of the information is 1, the terminal to send the uplink reference signal in multiple sending manners sequentially; or indicating, when the value of the information is 1, the terminal to send the uplink reference signal in a fixed sending manner; and indicating, when a value of the information is 0, the terminal to send the uplink reference signal in multiple sending manners sequentially.

5. The method of claim 1, wherein, transmitting the uplink reference signal by the base station and the terminal using a predefined manner comprises:

triggering, by the base station using the downlink control signalling, the terminal to send the uplink reference signal, wherein the downlink control signalling carries a downlink sending beam ID or a downlink sending beam index number, the downlink sending beam ID or the downlink sending beam index number being used by the terminal to determine a uplink sending beam ID or a uplink sending beam index number of the uplink reference signal.

6. The method of claim 1, wherein, transmitting the uplink reference signal by the base station and the terminal using a predefined manner comprises:

transmitting, by the terminal, the uplink reference signal in different uplink sending beams with the uplink reference signal using different cyclic shifts and/or different transmission comb indexes.

7. The method of claim 1, wherein, the base station receives capability parameter information sent by the terminal, the capability parameter information comprising at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

8. A method for sending an uplink reference signal, wherein comprises:

receiving, by a terminal, indication information sent by a base station using high-layer signalling or downlink control signalling, and sending an uplink reference signal in one or more sending manners based on the indication information; or sending, by the terminal, the uplink reference signal using a sending manner or resource predefined by both the base station and the terminal, wherein the terminal selects a resource in a resource pool to send the uplink reference signal as desired, wherein the base station configures the resource pool required for a plurality of terminals to send the uplink reference signal, wherein a way for the terminal to select the resource is configured by the base station or determined by the terminal according to an identity authentication ID and/or an antenna port number of the terminal.

9. The method of claim 8, wherein information carried by the downlink control signalling comprises at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

10. The method of claim 9, wherein the terminal determining the sending manner of the uplink reference signal based on a downlink receiving manner, comprises:

taking a direction of the receiving manner as a basic sending direction for sending the uplink reference signal, and sending, by the terminal, the uplink reference signal from an Nth sending manner in a left direction of the basic sending direction to an Nth sending manner in a right direction of the basic sending direction sequentially; or sending, by the terminal, the uplink reference signal from adjacent 2N+1 sending manners of the basic sending direction sequentially, wherein N is a integer and 1≤N≤32.

11. The method of claim 9, wherein, the information for indicating the terminal to send the uplink reference signal in one or more sending manners comprises:

indicating, when a value of the information is 0, the terminal to send the uplink reference signal in a fixed sending manner; and indicating, when the value of the information is 1, the terminal to send the uplink reference signal in multiple sending manners sequentially; or indicating, when the value of the information is 1, the terminal to send the uplink reference signal in a fixed sending manner; and indicating, when a value of the information is 0, the terminal to send the uplink reference signal in multiple sending manners sequentially.

12. The method of claim 8, wherein the sending, by the terminal, the uplink reference signal using a sending manner or resource predefined by both the base station and the terminal comprises:

transmitting, by the terminal, the uplink reference signal in different uplink sending beams with the uplink reference signal using different cyclic shifts and/or different transmission comb indexes.

13. The method of claim 8, wherein the terminal sends capability parameter information to the base station, the capability parameter information comprising at least one of:

number of transmission and reception units TXRUs that the terminal can support, or number of the sending manners that the terminal can support simultaneously;

number of the sending manners required to cover an entire cell, or number of antenna elements of total TXRUs and/or per TXRU; and number of fine sending beams corresponding to each coarse sending beam.

14. A base station, comprising a processor and a communication apparatus, wherein, the processor is adapted to determine an indication information for indicating a terminal to send an uplink reference signal in one or more sending manners;

the communication apparatus is connected with the processor, and adapted to implement the method of claim 1.

15. The base station of claim 14, wherein information carried by the downlink control signalling comprises at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

16. A terminal, comprising a processor and a communication apparatus; wherein, the communication apparatus is connected with the processor, and adapted to receive indication information sent by a base station using high-layer signalling or downlink control signalling, and send the indication information to the processor;

the processor is adapted to determine to send an uplink reference signal in one or more sending manners indicated by the indication information; or the communication apparatus is further adapted to send the uplink reference signal using a sending manner or resource predefined by both the base station and the terminal, wherein, the base station configures a resource pool required for a plurality of terminals to send the uplink reference signal, causing the terminal to select a resource in the resource pool to send the uplink reference signal as desired, wherein a way for the terminal to select the resource is configured by the base station or determined by the terminal according to an identity authentication ID and/or an antenna port number of the terminal.

17. The terminal of claim 16, wherein information carried by the downlink control signalling comprises at least one of:

information for indicating the terminal to determine the sending manner of the uplink reference signal based on a downlink receiving manner;

information for indicating the terminal to send the uplink reference signal in one or more sending manners;

information for indicating type of the uplink reference signal triggered by the terminal;

information for indicating the terminal to send the uplink reference signal for one or more times; and information for indicating whether the terminal triggers sending of the uplink reference signal, and the terminal to select a sending manner or a parameter set to trigger from multiple sending manners or parameter sets.

18. The terminal of claim 16, wherein the communication apparatus adapted to send the uplink reference signal using a sending manner or resource predefined by both the base station and the terminal is adapted to:

transmit the uplink reference signal in different uplink sending beams with the uplink reference signal using different cyclic shifts and/or different transmission comb indexes.

* * * * *